(12) United States Patent
Klein et al.

(10) Patent No.: US 11,826,668 B2
(45) Date of Patent: Nov. 28, 2023

(54) MODELING KIT INCLUDING CONNECTORS AND GEOMETRIC SHAPES, AND METHODS OF MAKING AND USING SAME

(71) Applicant: 3DUXDESIGN LLC, Fairfield, CT (US)

(72) Inventors: Ayana M Klein, Fairfield, CT (US); Ethan A Klein, Fairfield, CT (US); Marci S Klein, Fairfield, CT (US); David S Klein, Fairfield, CT (US)

(73) Assignee: 3DUXDESIGN LLC, Fairfield, CT (US)

( * ) Notice: Subject to any disclaimer, the term of this patent is extended or adjusted under 35 U.S.C. 154(b) by 140 days.

(21) Appl. No.: 16/123,192

(22) Filed: Sep. 6, 2018

(65) Prior Publication Data

US 2019/0070519 A1 Mar. 7, 2019

Related U.S. Application Data

(60) Provisional application No. 62/555,301, filed on Sep. 7, 2017.

(51) Int. Cl.
*A63H 33/10* (2006.01)
*G09B 1/32* (2006.01)
*B33Y 80/00* (2015.01)
*G09B 25/00* (2006.01)

(52) U.S. Cl.
CPC ......... *A63H 33/101* (2013.01); *A63H 33/102* (2013.01); *G09B 1/32* (2013.01); *B33Y 80/00* (2014.12); *G09B 25/00* (2013.01)

(58) Field of Classification Search
CPC ...... A63H 33/04; A63H 33/10; A63H 33/101; A63H 33/102; G09B 1/32
USPC ........................................................... 446/111
See application file for complete search history.

(56) References Cited

U.S. PATENT DOCUMENTS

| | | | | |
|---|---|---|---|---|
| 1,398,852 A | * | 11/1921 | Gilbert ................. | A63H 33/102 24/339 |
| 3,310,906 A | * | 3/1967 | Glukes ................. | A63H 33/065 446/95 |
| 3,417,505 A | * | 12/1968 | Schultz ................ | A63H 33/102 D25/138 |

(Continued)

FOREIGN PATENT DOCUMENTS

KR 20140105128 A * 9/2014

OTHER PUBLICATIONS

Translation KR20140105128A (Year: 2014).*

(Continued)

*Primary Examiner* — Eugene L Kim
*Assistant Examiner* — Alyssa M Hylinski
(74) *Attorney, Agent, or Firm* — UConn IP Law Clinic; Nolyn Allen; Natalie Saloio

(57) ABSTRACT

A building model connector is disclosed comprising a central body, an arm extending outwardly from the central body, the arm including a first arm portion, and a second arm portion, and first and second gripping teeth formed at the distal end of the first arm portion and the second arm portion, respectively, on the inner surface thereof. The first and second gripping teeth are configured to removably connect to a form such as a building panel. Corresponding systems and methods also are disclosed.

23 Claims, 21 Drawing Sheets

(56) References Cited

U.S. PATENT DOCUMENTS

| | | | | |
|---|---|---|---|---|
| 3,597,874 A | * | 8/1971 | Ogsbury | A63H 33/065 446/104 |
| 3,747,262 A | * | 7/1973 | Endres | A63F 1/04 446/124 |
| 3,827,177 A | * | 8/1974 | Wengel | A63H 33/101 446/112 |
| 3,998,002 A | * | 12/1976 | Nathanson | A63H 33/105 446/115 |
| 4,193,221 A | * | 3/1980 | Beck | A63H 33/10 446/124 |
| 4,296,524 A | * | 10/1981 | Horholt | F16B 5/0607 D8/382 |
| 4,731,041 A | * | 3/1988 | Ziegler | A63H 33/065 446/115 |
| 4,758,196 A | * | 7/1988 | Wang | A63H 33/08 403/171 |
| 4,792,319 A | * | 12/1988 | Svagerko | A63H 33/08 446/104 |
| 4,793,725 A | * | 12/1988 | Cheng | A47G 1/065 403/170 |
| 5,022,885 A | * | 6/1991 | Lyman | A63H 33/08 446/117 |
| 5,049,105 A | * | 9/1991 | Glickman | A63H 33/06 446/107 |
| 5,061,219 A | | 10/1991 | Glickman | |
| 5,121,526 A | * | 6/1992 | Burkard | A63H 33/10 24/336 |
| 5,137,486 A | * | 8/1992 | Glickman | A63H 33/062 446/124 |
| 5,199,919 A | | 4/1993 | Glickman | |
| 5,238,438 A | | 8/1993 | Glickman et al. | |
| 5,322,466 A | * | 6/1994 | Bolli | A63H 33/042 24/453 |
| 5,346,420 A | | 9/1994 | Glickman | |
| 5,350,331 A | * | 9/1994 | Glickman | A63H 33/042 446/120 |
| 5,368,514 A | | 11/1994 | Glickman et al. | |
| 5,421,762 A | | 6/1995 | Glickman | |
| 5,423,707 A | | 6/1995 | Glickman | |
| 5,427,559 A | | 6/1995 | Glickman et al. | |
| 5,482,491 A | * | 1/1996 | Kichijyo | A63H 33/08 446/112 |
| 5,487,690 A | * | 1/1996 | Stoffle | A63H 33/10 52/584.1 |
| 5,647,181 A | * | 7/1997 | Hunts | A63H 33/10 312/265.5 |
| 5,704,186 A | * | 1/1998 | Alcalay | A63H 33/062 52/848 |
| 5,725,411 A | * | 3/1998 | Glynn | A63H 33/086 403/4 |
| 5,729,867 A | * | 3/1998 | Carmichael | E04B 2/7429 16/225 |
| D393,417 S | | 4/1998 | Glickman | |
| 5,752,869 A | * | 5/1998 | Huff | A63H 3/16 446/102 |
| 5,755,608 A | | 5/1998 | Glickman | |
| 5,803,782 A | * | 9/1998 | Selton | A47B 47/005 446/125 |
| 5,816,882 A | * | 10/1998 | Guegan | A63H 33/12 446/123 |
| D400,603 S | * | 11/1998 | Glickman | D21/484 |
| D400,606 S | * | 11/1998 | Glickman | D21/484 |
| 5,910,038 A | * | 6/1999 | Zheng | A63H 33/067 446/114 |
| 5,913,706 A | | 6/1999 | Glickman et al. | |
| D415,216 S | * | 10/1999 | Krog | D21/502 |
| 5,961,365 A | | 10/1999 | Lambert | |
| D417,705 S | * | 12/1999 | Rudy | D21/501 |
| 6,015,149 A | * | 1/2000 | Burk | A63F 1/04 273/148 A |
| 6,050,044 A | | 4/2000 | McIntosh | |
| 6,068,533 A | | 5/2000 | Glickman et al. | |
| 6,086,444 A | | 7/2000 | Glickman | |
| 6,089,941 A | | 7/2000 | Glickman et al. | |
| 6,142,847 A | * | 11/2000 | Rudy | A63H 19/30 446/122 |
| 6,398,612 B2 | * | 6/2002 | Gudger | A63H 33/04 446/108 |
| 6,402,581 B1 | * | 6/2002 | Podgaiz | A63H 33/04 403/174 |
| D474,513 S | * | 5/2003 | Kichijo | D21/503 |
| 6,592,421 B1 | * | 7/2003 | Clever | A63H 33/082 446/108 |
| 6,648,715 B2 | * | 11/2003 | Wiens | A63H 33/062 446/121 |
| 6,676,474 B2 | * | 1/2004 | Glickman | A63H 33/062 446/120 |
| 6,746,298 B1 | * | 6/2004 | Doepner | A63H 18/028 446/126 |
| 6,978,581 B1 | * | 12/2005 | Spakousky | E04B 2/8617 52/405.1 |
| 6,997,458 B1 | * | 2/2006 | Yokomi | A63F 9/0415 273/288 |
| 7,044,825 B2 | | 5/2006 | Glickman et al. | |
| 7,047,576 B2 | * | 5/2006 | Tavivian | A47K 3/30 4/596 |
| 7,159,370 B2 | * | 1/2007 | Oliphant | E04C 3/30 52/845 |
| D545,922 S | | 6/2007 | Glickman et al. | |
| D550,307 S | | 9/2007 | Glickman | |
| D550,308 S | | 9/2007 | Glickman et al. | |
| D550,309 S | | 9/2007 | Glickman | |
| D550,310 S | | 9/2007 | Glickman | |
| D550,782 S | | 9/2007 | Glickman et al. | |
| D550,783 S | | 9/2007 | Glickman | |
| D550,784 S | | 9/2007 | Glickman et al. | |
| D550,785 S | | 9/2007 | Glickman et al. | |
| 7,267,598 B2 | | 9/2007 | Glickman | |
| D552,190 S | | 10/2007 | Glickman et al. | |
| D553,199 S | | 10/2007 | Glickman et al. | |
| D553,200 S | | 10/2007 | Glickman et al. | |
| D553,201 S | | 10/2007 | Glickman et al. | |
| D553,202 S | | 10/2007 | Glickman et al. | |
| D553,204 S | | 10/2007 | Glickman et al. | |
| D556,271 S | | 11/2007 | Glickman et al. | |
| D561,845 S | | 2/2008 | Glickman et al. | |
| D561,846 S | | 2/2008 | Glickman et al. | |
| D561,847 S | | 2/2008 | Glickman et al. | |
| D563,485 S | | 3/2008 | Glickman | |
| D566,201 S | | 4/2008 | Glickman et al. | |
| 7,398,622 B2 | * | 7/2008 | Walker | E06B 1/6007 52/204.69 |
| D579,062 S | | 10/2008 | Glickman et al. | |
| 7,444,792 B2 | * | 11/2008 | Matson | E04D 12/00 24/336 |
| D581,993 S | | 12/2008 | Glickman et al. | |
| 7,588,476 B2 | * | 9/2009 | Hammond | A63H 33/086 446/104 |
| D608,400 S | * | 1/2010 | Ryaa | D21/500 |
| 7,662,014 B2 | * | 2/2010 | Fleishman | E04B 1/3211 446/97 |
| 7,666,054 B2 | | 2/2010 | Glickman et al. | |
| D630,264 S | * | 1/2011 | Ryaa | D21/499 |
| 8,079,890 B2 | * | 12/2011 | Seligman | A63H 33/042 446/124 |
| D659,201 S | | 5/2012 | Glickman | |
| D660,379 S | | 5/2012 | Glickman | |
| D660,380 S | | 5/2012 | Glickman | |
| D660,381 S | | 5/2012 | Glickman | |
| D660,382 S | | 5/2012 | Glickman | |
| 8,597,069 B2 | | 12/2013 | Glickman | |
| 8,753,162 B2 | * | 6/2014 | Jensen | A63H 33/044 446/85 |
| 8,807,607 B2 | | 8/2014 | Glickman | |
| D712,234 S | | 9/2014 | Glickman et al. | |
| 8,968,046 B2 | * | 3/2015 | Cochella | A63H 33/062 446/111 |
| 9,044,690 B2 | * | 6/2015 | Uttley | A63H 33/102 |
| 9,067,147 B1 | * | 6/2015 | Woodhouse | A63H 33/003 |
| D736,057 S | | 8/2015 | Glickman et al. | |

(56) References Cited

U.S. PATENT DOCUMENTS

| | | | | |
|---|---|---|---|---|
| 9,160,129 | B2* | 10/2015 | Brickner | B24B 7/17 |
| 9,382,932 | B2* | 7/2016 | Nelson | F16B 7/0446 |
| 9,435,148 | B2 | 9/2016 | Glickman et al. | |
| 9,435,149 | B1 | 9/2016 | Glickman et al. | |
| 9,458,872 | B2* | 10/2016 | Nelson | F16B 7/00 |
| 9,649,572 | B2* | 5/2017 | Strand | A63H 33/042 |
| 9,821,241 | B2* | 11/2017 | Haner | A63H 33/08 |
| 9,982,477 | B1 | 5/2018 | Glickman et al. | |
| 10,039,991 | B2* | 8/2018 | Fernandez | A63H 33/084 |
| D832,366 | S* | 10/2018 | Ornstein | D21/486 |
| 10,398,999 | B2* | 9/2019 | Cochella | A63H 33/046 |
| 10,561,958 | B2* | 2/2020 | Purwar | A63H 33/12 |
| 2001/0003694 | A1* | 6/2001 | Gudger | A63H 33/10 446/85 |
| 2002/0090881 | A1* | 7/2002 | Turnham | A63H 33/10 446/85 |
| 2003/0224690 | A1* | 12/2003 | Manville | A63H 33/101 446/113 |
| 2008/0086972 | A1 | 4/2008 | Glickman | |
| 2013/0230353 | A1* | 9/2013 | Murphy | A63H 33/105 264/400 |
| 2015/0072587 | A1* | 3/2015 | Ornstein | A63H 33/046 446/92 |
| 2015/0240847 | A1* | 8/2015 | Nosalik | A63H 33/101 24/455 |
| 2016/0303487 | A1* | 10/2016 | Ayers | A63H 33/084 |
| 2016/0317939 | A1* | 11/2016 | Fernandez | A63H 33/084 |
| 2017/0030391 | A1* | 2/2017 | Klein | F16B 12/2063 |
| 2020/0171402 | A1* | 6/2020 | Cochella | A63H 33/101 |

OTHER PUBLICATIONS

Spectrum Nasco, Octa-Clips Connectors Set—(50 Pieces), Spectrum Nasco. https://spectrum-nasco.ca/product.htm?product=94215&source=cart (2017 or earlier, 4 pages).

3D-MON, CMSS—Customizable Modular Storage System—Connector (Jul. 28, 2016), Thingiverse. https://www.thingiverse.com/thing:1369482 (4 pages).

Boxly: the Cardboard Fort-Building Kit, Boxly. https://www.kickstarter.com/projects/boxlyinc/boxly-the-cardboard-fort-building-kit (2015, 10 pages).

* cited by examiner

MODELING KIT INCLUDING CONNECTORS AND GEOMETRIC SHAPES, AND METHODS OF MAKING AND USING SAME

BACKGROUND

This disclosure relates generally to educational toys, and model systems, and more particularly to a construction kit.

There are commercially available construction play sets on the market for children geared toward creative play, basic geometry, experimentation and structural relationships. Additionally, there are interactive computer programs designed to offer children an introduction to 3D modeling and Computer Aided Design (CAD). However, most commercially available downloadable designs for 3D printed products for children and adults are novelty items and of minimal functional use.

It would be useful to develop educational toys that provide children with exposure to 3D printing.

SUMMARY

One embodiment described herein is a building model connector, comprising a central body, and an arm extending outwardly from the central body, the arm including a first arm portion, and a second arm portion that is generally parallel to the first arm portion, each arm portion having a first end connected to the central body and a distal end spaced from the first end, an inner surface and an outer surface. First and second gripping teeth are formed at the distal end of the first arm portion and the second arm portion, respectively, on the inner surface thereof. The first and second gripping teeth are configured to removably connect to a form.

Another embodiment described herein is a system comprising a plurality of form and a plurality of the connectors described in the previous paragraph.

Yet another embodiment is method, comprising obtaining a plurality of forms and obtaining a plurality of connectors, each comprising a central body, an arm extending outwardly from the central body, the arm including a first arm portion, and a second arm portion that is generally parallel to the first arm portion, each arm portion having a first end connected to the central body and a distal end spaced from the first end, an inner surface and an outer surface, and first and second gripping teeth formed at the distal end of the first arm portion and the second arm portion, respectively, on the inner surface thereof. The method further comprises connecting the plurality of forms to one another using the connectors, wherein a portion of each form is disposed between at least one set of the first and second gripping teeth of at least one connector.

DETAILED DESCRIPTION

Figure 1:
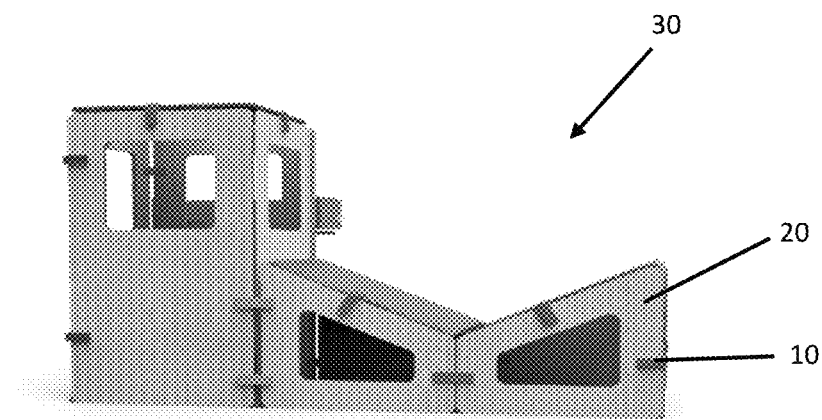
FIG. 1 shows a structure that was built with a first embodiment of a modeling kit described herein.
Figure 2:
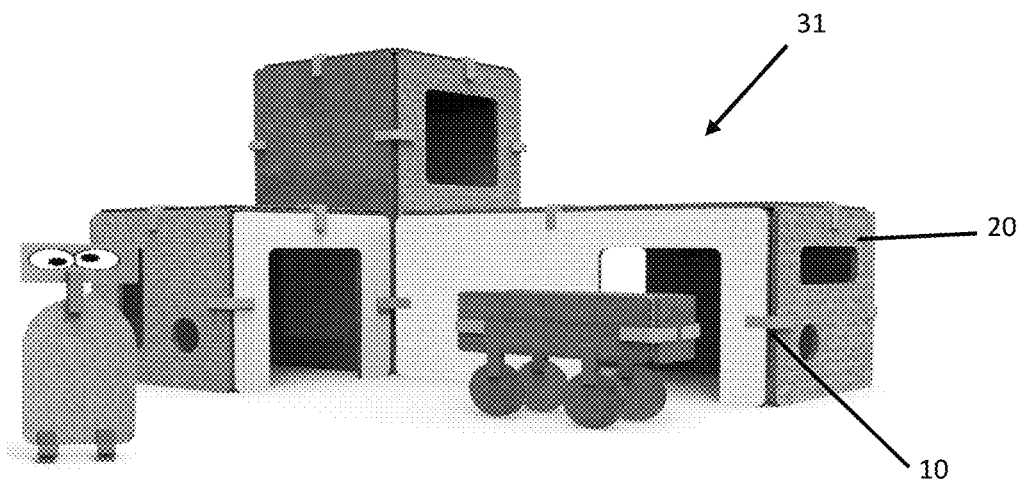
FIG. 2 shows another structure built with the modeling kit.
Figure 3:
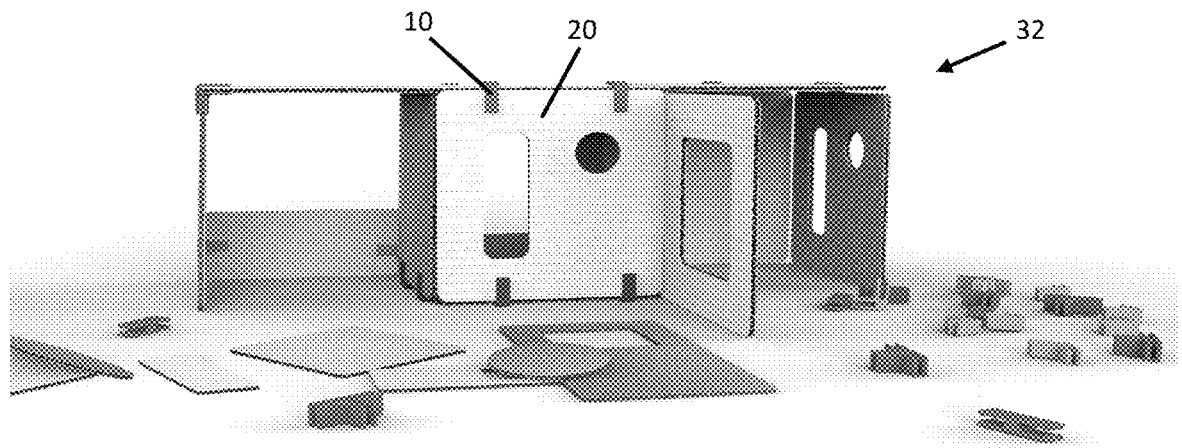
FIG. 3 shows yet another structure built with the modeling kit.
Figure 4:
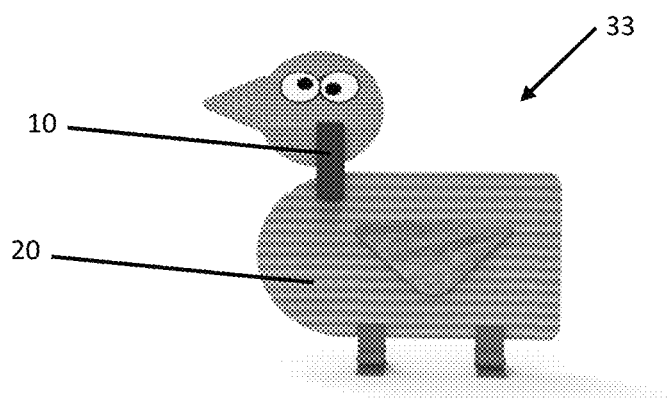
FIG. 4 shows an animal figure built with the modeling kit.

The embodiments disclosed herein promote STEAM education by integrating up to four features: (1) physical constructive and imaginative play, including hands-on modeling and 3D design (2) integration of product with CAD (computer aided design) learning (3) additive technology (3D printers) and (4) use of recycled and repurposed materials in building set thereby minimizing environmental impact and promoting environmental awareness. The embodiment described herein allow youth to integrate modern computer technology with the physical world, complex structural thinking and environmental awareness in a highly engaging and creative way.

One embodiment described herein provides a unique design for an architectural modeling set that makes use of connectors and geometric forms. The connectors have been designed to fit the range of most commonly used cardboard thicknesses in shipping boxes to allow the end user the ability to use recycled cardboard for building and modeling. The connectors are constructed to have a balance between the flexibility and structural stability to adapt the range of cardboard thicknesses and afford adequate "grab" for a stable model. In embodiments, the connectors are dimensioned to be compatible with corrugated cardboard having two flat sheets separated by a corrugated portion. In embodiments, the forms are sufficiently stiff that they remain planar or flat when disposed vertically or horizontally. Furthermore, in embodiments, the forms are deformable in an amount sufficient to allow them to be temporarily held in a stationary position between adjacent teeth of a connector. To be supported by a particular connector, a more deformable material can be thicker than a less deformable material.

The connector specifications and dimensions may be adapted to fit a range of other commonly available sheet goods including but not limited to cork, foam board, acrylic sheets, balsa and bass wood. The connectors are designed for easy manufacturing through 3D printing, extrusion and injection molding, processes. Software can be provided to end users to manufacture their own connectors by 3D printing or the like. The software also can provide for the manufacture of connectors having customized properties including size, hardness, rigidity, etc. Novel angles and shaped connectors may be developed for a variety of models including but not limited to door hinges, wall hanging clips for display purposes, hanging sliding doors, functional wheel attachment. Specialty connectors that would attach to commercially available building bricks and models such as Lego® and K'nex® also can be formed. In another embodiment, software is provided for cutting forms from cardboard or the like.

One embodiment comprises a set of connectors that all have similar arm, body and teeth dimensions that allows them to interlock with themselves, creating connector-only 2D patterns and mosaic designs.

One embodiment of the cardboard forms included in the kits comprises forms having white matte on one side to allow the user the ability to use pencil, marker, paint, glue and stickers to detail and decorate the model created. In other embodiments, the cardboard forms have an erasable outer surface such as whiteboard material upon which erasable markers can be used, or a surface suitable for drawings with pencils, chalk, etc. In another embodiment, the sheet material may be printed on one or both sides with graphic designs, images, characters, etc.

Definitions

As used herein, the term "building model connector" means a component configured to removably connect forms to one another.

As used herein, the term "building panel" means a sheet-like form used to construct toy or model buildings, animals, people, vehicles, and other structures.

One embodiment described herein is an architectural modeling kit comprising a series of uniquely shaped plastic connectors and geometrically shaped cardboard forms for the purpose of educational and creative play.

In embodiments, the connectors disclosed herein are used to connect single ply cardboard ranging from a thickness of about 0.05 to about 0.2 inches, or about 0.09 to about 0.170 inches, or about 0.1 to about 0.15 inches. In embodiments, the connectors are configured to support the most commonly commercially available cardboard used nationally for packaging and shipping. In some cases, the connectors are configured to connect other materials with a thickness ranging from about 0.05 inches to about 0.3 inches, including but not limited to wood, foamboard, and plastic sheet goods.

The connectors can be configured to have adequate flexibility to connect to a range of cardboard (and other material) thicknesses, elasticity to regain their manufactured form while also having the structural integrity and "grab" necessary to supply a high degree of structural support for the end user to construct a range of models including those with small pieces down to under one inch in size and fine details, to large, complex, and multiple level models having a height of at least about 6 feet.

The connectors are designed in multiple configurations described below to allow the end user the ability to create a wide array of models ranging from but not limited to simple characters and vehicles to more complex prototypes of inventions and science products and buildings or entire communities.

The connectors are designed such that they are elegantly simple and intuitive, easily manually attached to and removed from cardboard (and other sheet materials) for continued construction, deconstruction and reuse of models.

In some embodiments, the connectors are configured with consistent geometry of the protrusions such that one can interlock the connectors in a 2 dimensional manner to create patterns and therefore use the connectors independently of cardboard or other sheet materials.

The connectors are designed with contours such that they may be also created by the end user on personal or locally available 3D printers using the downloadable CAD files supplied by the inventors. Licensing of these files may therefore allow educational institutions to teach students the basics of CAD, complex spatial thinking and 3D printing by creating (and sharing) novel versions of the aforementioned connectors that integrate with our architectural modeling sets.

The connectors are designed such that they may be 3D printed, and manufactured on a larger scale by methods including injection molding, compression molding or extrusion methods. The connectors may be solid or hollow. When the connectors are hollow, their wall thickness is selected to provide a combination of flexibility and durability.

In some cases, the connectors are configured with sufficiently long arms that they do not present a choking hazard for children under the age of 3.

Additional features, functions and benefits of the disclosed architectural kit will be apparent from the description which follows, particularly when read in conjunction with the figures.

OVERVIEW OF SELECTED DRAWINGS

FIGS. 1-5 show exemplary samples of the connectors and geometric cardboard forms, and illustrate the versatility and wide range of models that can be constructed and painted or otherwise decorated by the end user.

Figure 5:
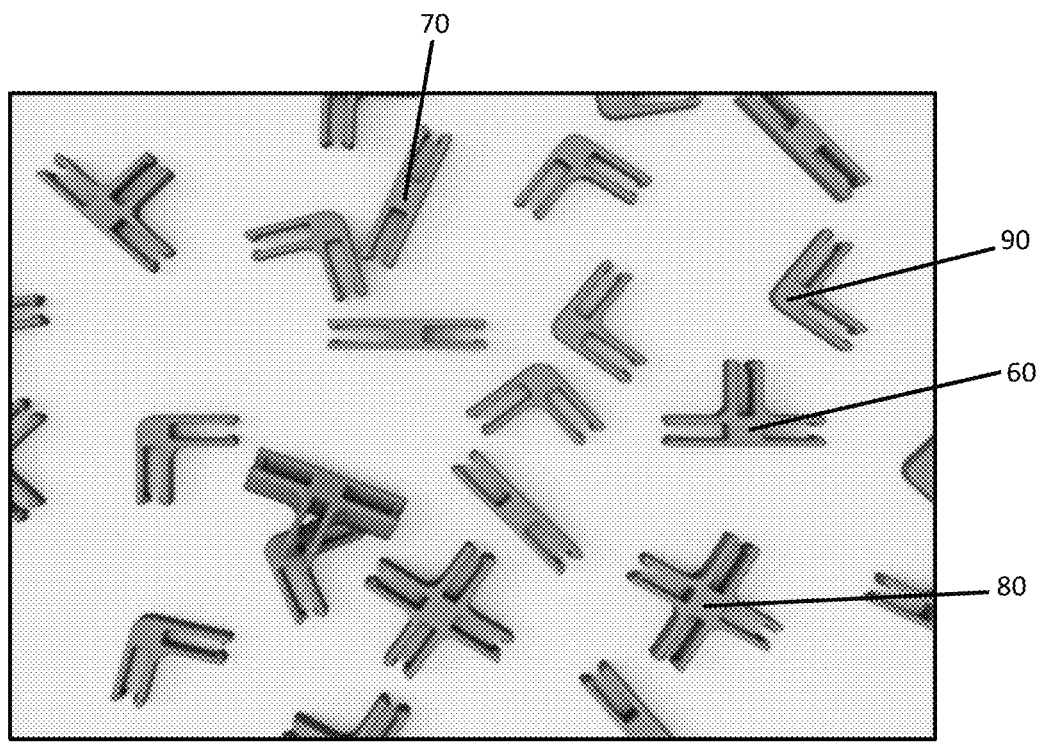
FIG. 5 shows a set of connectors included in the modeling kit.
Figure 6:
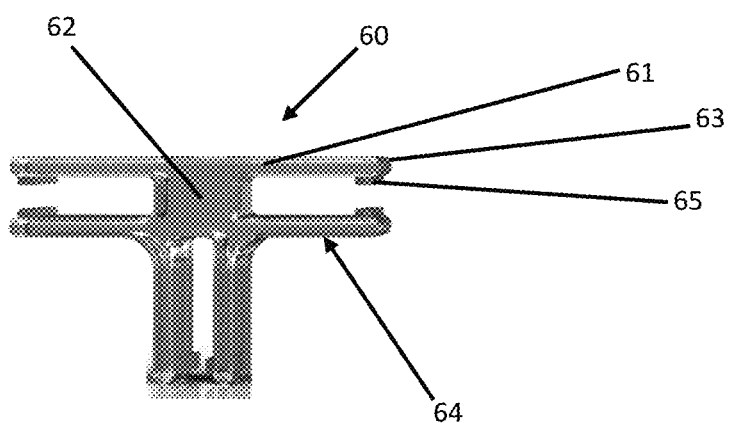
FIG. 6 shows a first view of a T-shaped connector.

FIG. 5 shows an exemplary collection of assorted 3D plastic connectors in various configurations to be described in detail below.

Figure 27:
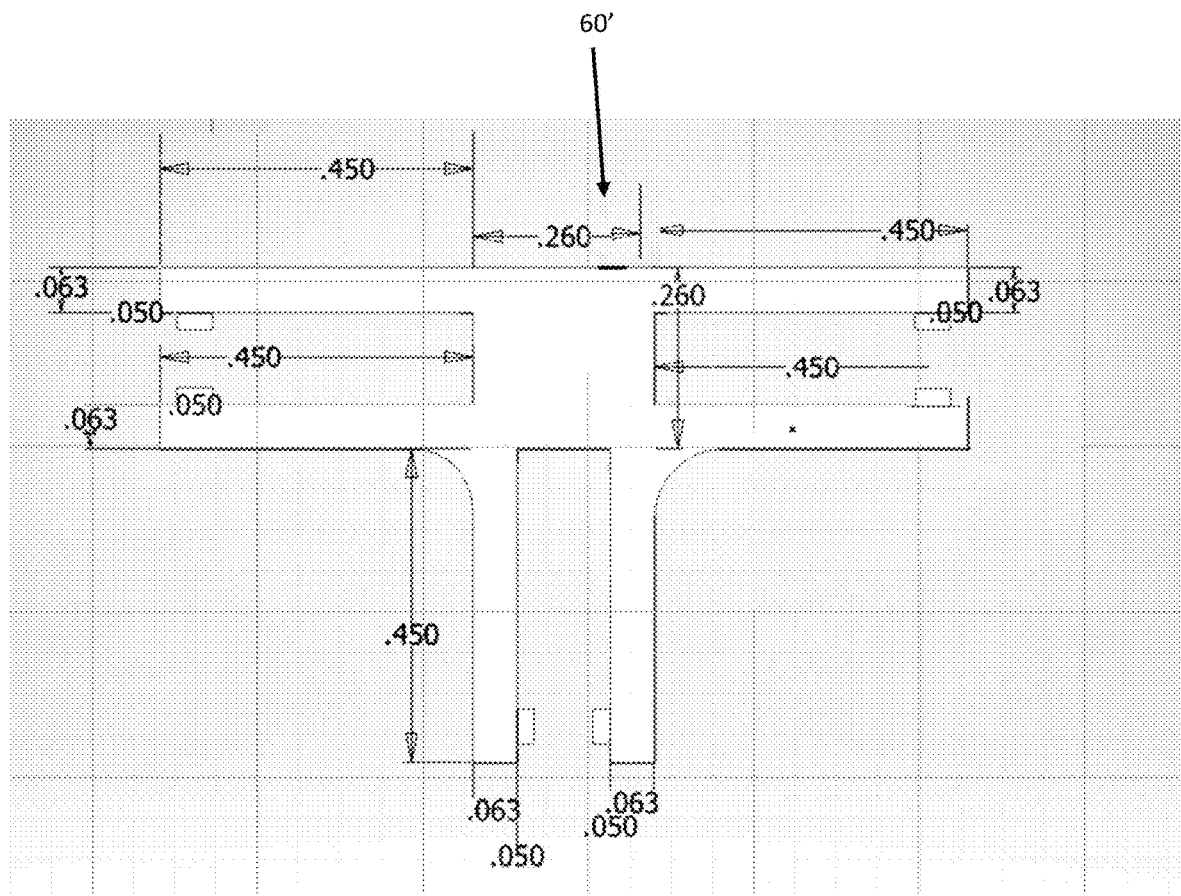
FIG. 27 shows detailed dimensions (in inches) of one version of a T-shaped connector.

FIG. 27 shows an exemplary embodiment of the disclosed 3D plastic connector schematically depicted for more detailed discussion of design and engineering specifications and how these specifications relate to function.

Figure 34:
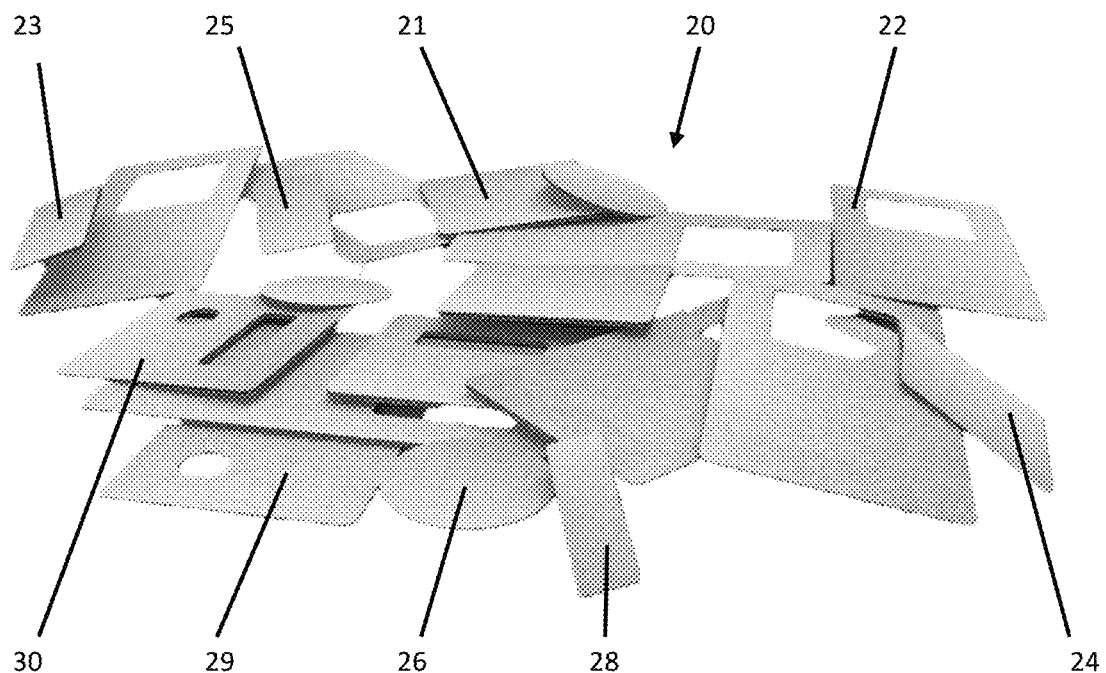
FIG. 34 shows a set of forms that can be connected using the connectors shown in FIGS. 1-30, 33 and 35-38.
Figure 38:
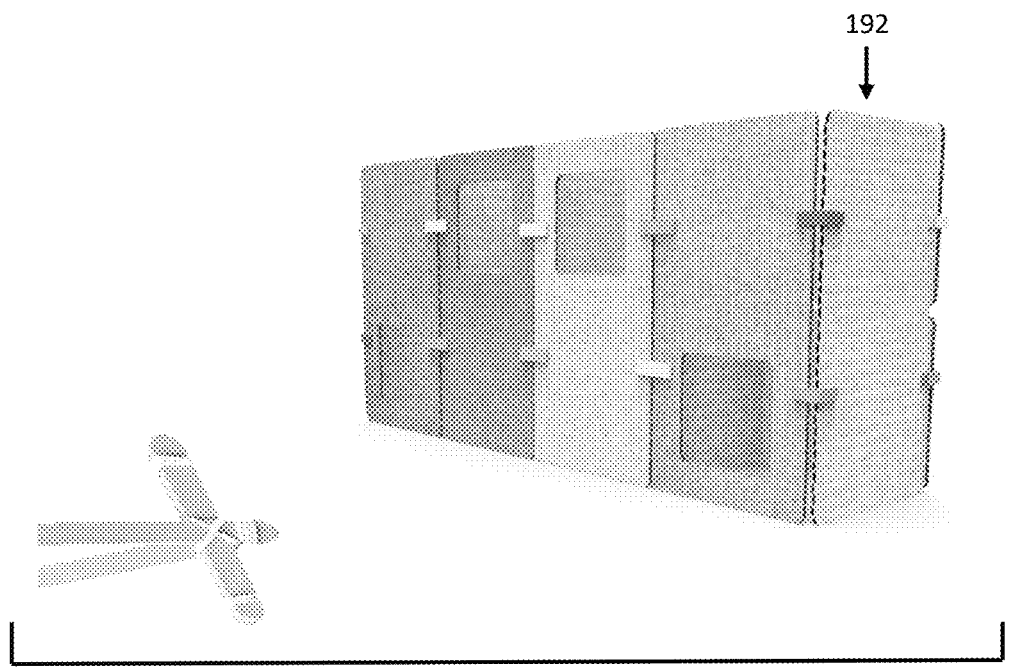
FIG. 38 shows another toy house constructed using the modeling kit.
Figure 39:
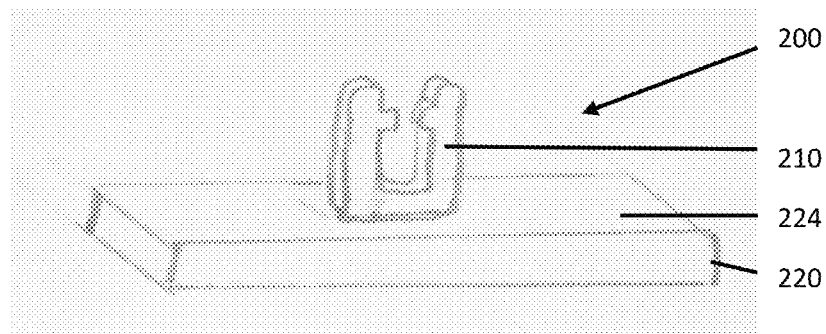
FIG. 39 shows a perspective view of a hybrid connector configured for use with a conventional toy construction set.
Figure 40:
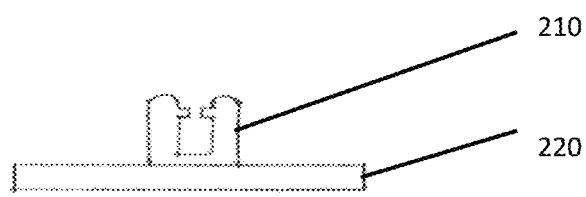
FIG. 40 shows a front view of the hybrid connector shown in FIG. 39.
Figure 41:
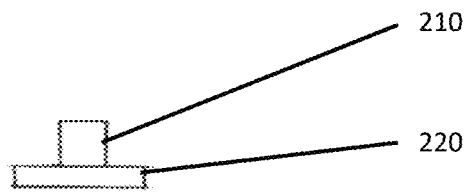
FIG. 41 shows a side view of the hybrid connector shown in FIG. 39.
Figure 42:
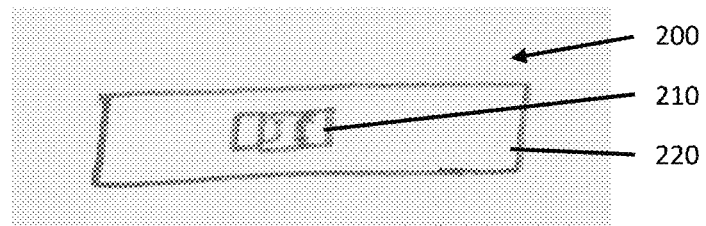
FIG. 42 shows a top view of the hybrid connector shown in FIG. 39.
Figure 43:
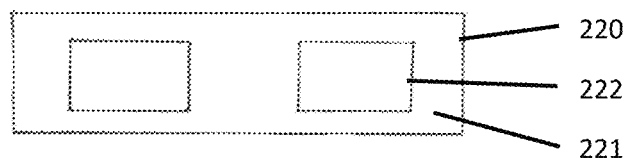
FIG. 43 shows a bottom view of the hybrid connector shown in FIG. 39.
Figure 44:
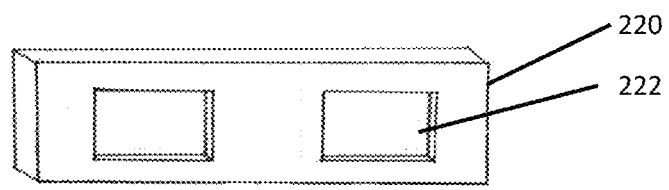
FIG. 44 shows a bottom perspective view of the hybrid connector shown in FIG. 39.

FIG. 34 shows an exemplary sampling of geometric forms made of cardboard or another suitable material that are used to create structures including but not limited to creative figures, vehicles, and architectural models. Non-limiting examples of suitable forms 20 for a building set include various sizes and shapes of solid rectangles (21), (23), (24), (25), (28), rectangles with cutouts (22), (29), (30), and circles (26) of various sizes, which may be solid or may have cut-outs. The forms can be cut from sheet blanks. FIG. 35-38 show exemplary models of other products that can be made using the disclosed connectors and geometric forms including but not limited to a door (160) with hinges (FIG. 35), wall art (21) created with media (40) and mounted with a connector (110b) and a screw or wall hook (FIG. 36), a larger scale play and storage structure (190) (FIG. 37), and a structure (192) for do it yourself (diy) games (FIG. 38).

Referring to the drawings in detail, FIGS. 1-5 show an assortment of the disclosed connectors (10) as supplied to the end user are to be used with geometric shaped forms (20) comprising cardboard or other materials (20) to create various architectural and other physical models (30). These models (3) can be decorated with various art media (40) including but not limited to craft paint, marker, pencil, crayon, felt, craft paper, stickers, glue. FIGS. 1-4 depict the disclosed products in the form of architectural models (30), (31), (32), (33) and figures such as buildings, vehicles, animals, people and characters for creative play and exploring structural relationships.

As shown in various figures, the connectors, which optionally may be 3D printed, may be made in various configurations for different methods of connecting cardboard at different angles as shown but not limited to 2 cardboard-piece 120 degree angle connector (50), 3 cardboard-piece right angle connector (60), 2 cardboard-piece 180 degree angle connector (70), 4 cardboard-piece right angle connector (80), 2 cardboard-piece right angle connector (90), 2 cardboard-piece 60 degree angle (100), 2-piece hinge connector component (110a), 2-piece hinge connector component (110b) for creating functional doors and shutters (160), wheel axle 2 cardboard-piece connector (170), and 1 cardboard-piece connector with transversely oriented hole (180) for attachment of assembly to walls or vertical structures (190) with component (110b). Additional possible connectors (not shown) include a LEGO® compatible and/or K'nex® compatible end for integrating the disclosed system with commercially available building sets, and hexagonal connectors that allow for attachment of up to 6 pieces of cardboard for construction.

FIGS. 6-11 and 27 show an embodiment of a 3-way connector (60) with attention to structural details. This embodiment comprises a central body (62) with a height (the vertical dimension in FIG. 27) of about 0.3 inches that typically will range from about 0.2 inches to about 1.0 inches, or about 0.25 to about 0.5 inches, to adapt to finer detailed or larger format uses. The central body (62) has a width (thickness) of about 0.26 inches and a length (left to right in FIG. 27) of about 0.26 inches. In embodiments, the width and length may range from about 0.2 inches to about 0.5 inches depending on sheet materials and scale of project for which the connector is used. The arms (64) of the connectors extend outwardly from the central body (62) and usually have a height of about 0.3 inches and may range from about 0.2 to about 1.0 inches, or about 0.25 to about 0.5 inches, to adapt to finer detailed or larger format uses. In the embodiment shown in FIGS. 6-11, the three arms are co-planar with respect to one another. The length of the arms (64) (left to right in FIG. 27) is about 0.45 inches with a range between about 0.3 inches to about 1.0 inches, or about 0.4 to about 0.7 inches, to adapt to the scale of the project. The arms may all have the same length or may have different lengths. The arm (64) has a width (thickness) of about 0.26 inches. In embodiments, the width of the arms (64) is the same as a width of the central body (62). Each arm (64) includes an inner end portion (61) connected to the central body (62) and a distal end portion (63). In this embodiment, the 3-way connector is T-shaped, with a 90 degree angle between arm (64a) and arm (64e), a 90 degree angle between arm (64e) and arm (64c), and a 180 angle between arm (64c) and arm (64a).

Each arm (64) includes a first arm portion (67a), (67c), (67e) and a second arm portion (67b), (67d), (67f) that is generally parallel to associated first arm portion. In the embodiment shown in FIG. 27, arm portions in a particular pair are separated from one another in an amount of about 0.134 inches (when the teeth are not taken into account). More specifically, arm (64a) includes first arm portion (67a) and second arm portion (67b), arm (64c) includes first arm portion (67c) and second arm portion (67d), and arm (64e) includes first arm portion (67e) and second arm portion (67f). In the embodiment shown in the figures, each arm portion has a height of about 0.063 inches, with a range of about 0.05 inches to about 0.07 inches, to adapt to the weight and compressibility of the sheet material to be inserted.

Figure 7:
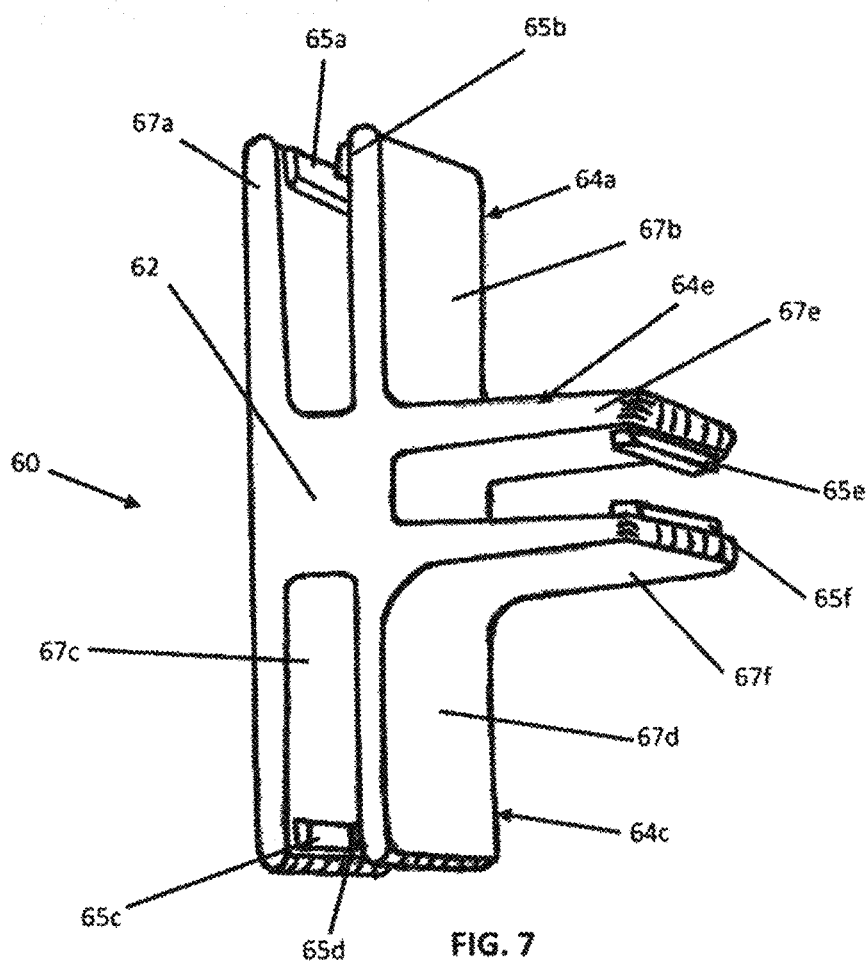
FIG. 7 shows a second view of a T-shaped connector.
Figure 8:
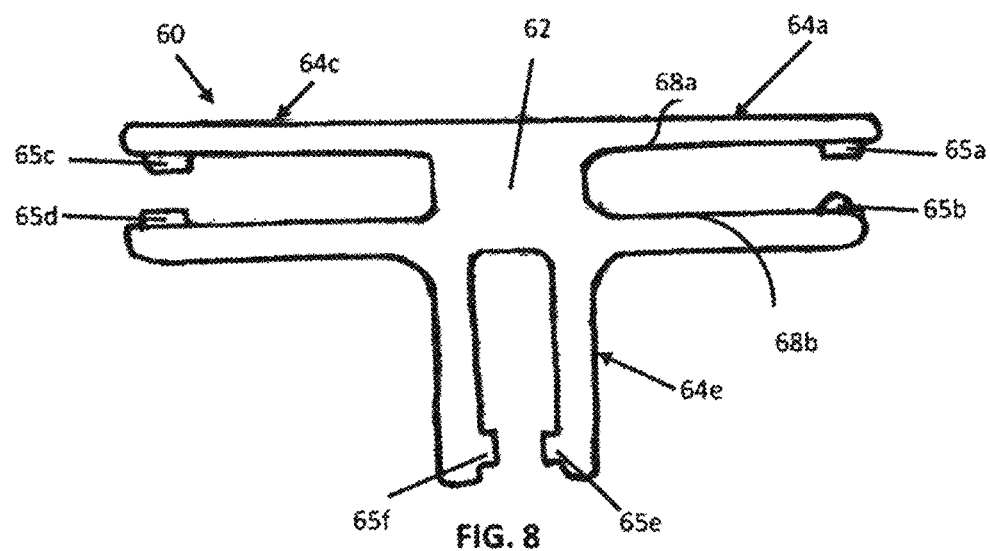
FIG. 8 shows a front view of the T-shaped connector.
Figure 9:
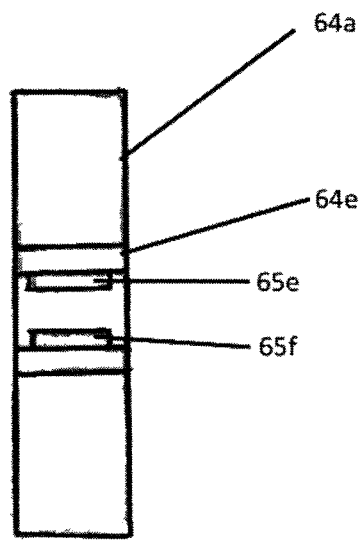
FIG. 9 shows a top view of the T-shaped connector.
Figure 10:
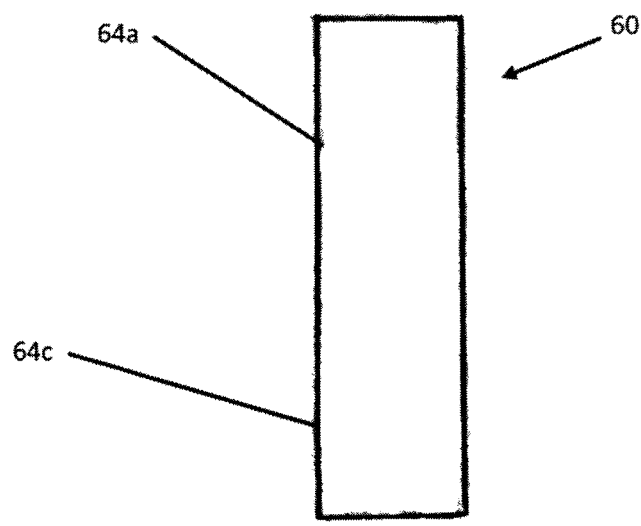
FIG. 10 shows a bottom view of the T-shaped connector.
Figure 11:
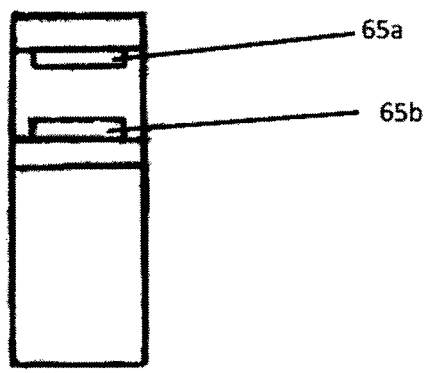
FIG. 11 shows a side view of the T-shaped connector.

A pair of opposing "teeth" (65), including pairs of individual teeth (65a)-(65e), as shown on FIGS. 7-8, are positioned at the distal end of the respective first arm portion (67) or second arm portion (68) and protrude from the internal surfaces 68a, 68b of the arm portions (67a), (67b), respectively. This distal position, in conjunction with the arm (64) height, length and thickness is critical to the function of the connector as a balance between flexibility and structural rigidity to allow for easy manipulation and adequate stability of the sheet material to be inserted. The teeth (65) have a thickness of about 0.26 inches. In embodiments, the thickness of the teeth is the same as a width of the central body (62) and the arms (64). In the embodiment shown in FIG. 27, the teeth have a depth (in the direction toward each other) of 0.025 inches with a resulting distance between opposing teeth (65) of about 0.084 inches. In general, when cardboard forms are used, the terminal ends of teeth on a particular arm are spaced from one another in an amount of about 0.04 to about 0.12 inches, or about 0.05 inches to about 0.10 inches.

The length of the teeth (65) in a direction parallel to the length of the arms (64) is about 0.03 inches to about 0.1 inches, or about 0.04 inches to about 0.07 inches, or about 0.05 inches, This distance between opposing teeth will be adjusted by adaptations in the central body (66) length and width to adapt to a variety of sheet material thicknesses to be used by the end user on a project. In embodiments, the distance between the terminal end of opposing teeth is slightly less than the thickness of the form 20 with which the connector is to be used. In the embodiment shown in the Figures, the specifics of the arm (64) and tooth (65a, 65b) geometry and the distance between opposing arms (64) and teeth (65) are engineered such as to afford optimal space to accommodate single ply cardboard with thickness ranging between 0.09 to 0.170 (as is industry standard for the majority of shipping and packaging boxes but may be adapted for other sheet material that may be used. The geometry of the arm (64) has length of 0.45 inches and an arm portion height of about 0.063 inches is optimized to offer the necessary flexibility to accommodate the aforementioned variation in commercially available cardboard and the rigidity necessary for creating large and complex, yet structurally sound models. In addition, the tooth (65a, 65b) geometry is 0.05 inches wide by 0.05 inches long to optimally hold cardboard (or other sheet material) securely in place.

The teeth (65) are designed with a slightly convex curved terminal end, or a flat terminal end, to allow for a combination of good grippability to the forms along with easy insertion and removal of cardboard pieces, thereby avoiding damage to cardboard pieces and making it easier for young children to assemble. In some cases, the terminal end of the teeth has a smooth outer surface. In other cases, the terminal end of the teeth has a rough or textured surface to further improve grippability of the teeth. One non-limiting example of a textured surface that can be used at the terminal end of the teeth is a ribbed surface in which the ribs extend in a direction that is parallel to the length of the arms (64).

The additional disclosed connector profiles shown in FIGS. 12, 14, 16, 21, 22, 24 and 26, and any such similarly designed connectors obey the same geometry with respect to arm (64), tooth (65) and central body (62). The shape, length, width and height will vary in number and/or angle of the aforementioned arms (14) and teeth (15). The number of arms and the relative angles of the arms varies. This allows for added functionality in the product including assembly of interlocking patterns to form a wide variety of two dimensional and three dimensional models.

Figure 12:
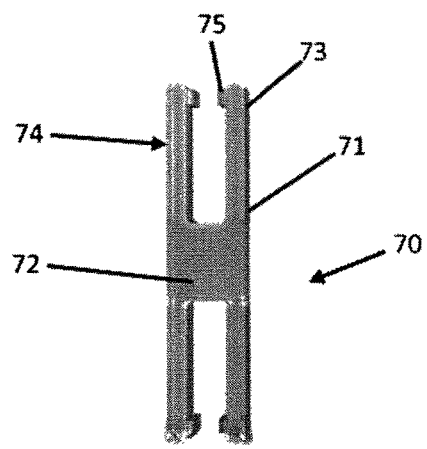
FIG. 12 shows a linear connector.
Figure 13:
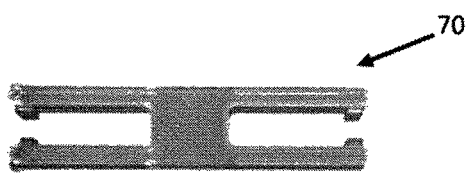
FIG. 13 shows a front view of a linear connector.
Figure 14:
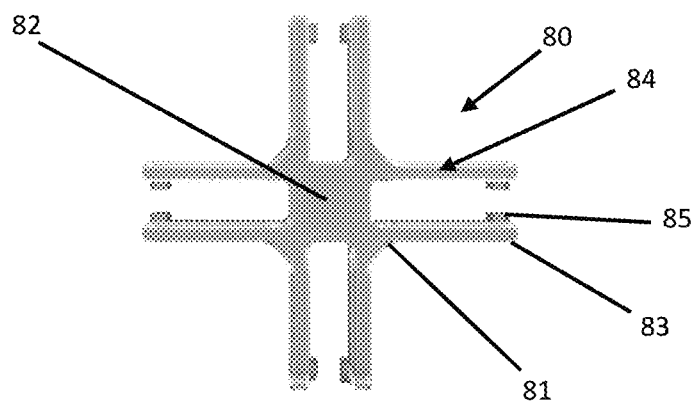
FIG. 14 shows a cross-shaped connector.
Figure 15:
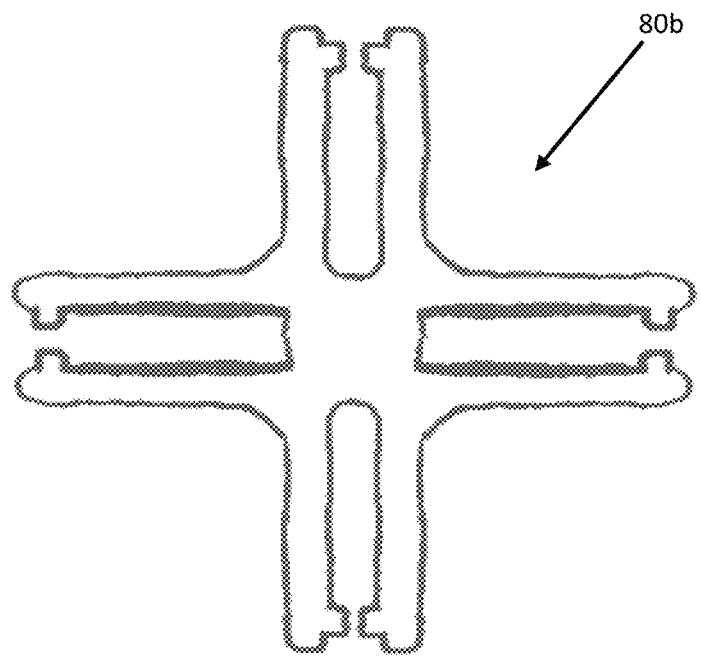
FIG. 15 shows a front view of a cross-shaped connector.

Additionally, the disclosed connector profiles shown in FIGS. 12, 14, 16, 21, 22, 24 and 26 are similarly subject to adjustment in arm, tooth and body dimensions to accommodate other substrates with dimensions that differ from the aforementioned single ply cardboard. As such for example, the size of the body height, length, width and distance between opposing arm portions for the arms, and the height, length, width and distance between opposing teeth may be widened and thickened to accommodate 0.25 inch thick foam board or other materials of varying thicknesses. FIG. 12 shows a two-way connector (70) with a central body (72), two arms (74) extending outwardly from the central body (72), with each arm including an inner end portion (71) connected to the central body (72) and an opposite distal end portion (73). Teeth (75) are formed on the inner side of each arm portion. This connector is also shown in FIG. 13. FIG. 14 shows a four-way connector (80) with a central body (82), four arms (84) extending outwardly from the central body (82), with each arm including an inner end portion (81) connected to the central body (82) and an opposite distal end portion (83). Teeth (85) are formed on the inner side of each arm portion. The connector is cross-shaped with 90 degree angles between adjacent arms (84). FIG. 15 shows a four-way connector (80b).

Figure 16:
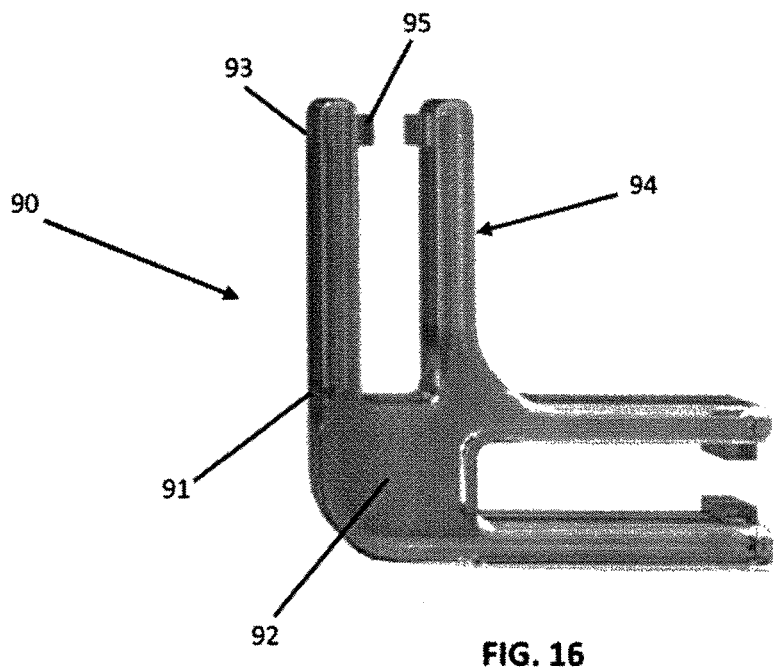
FIG. 16 shows an L-shaped connector.
Figure 17:
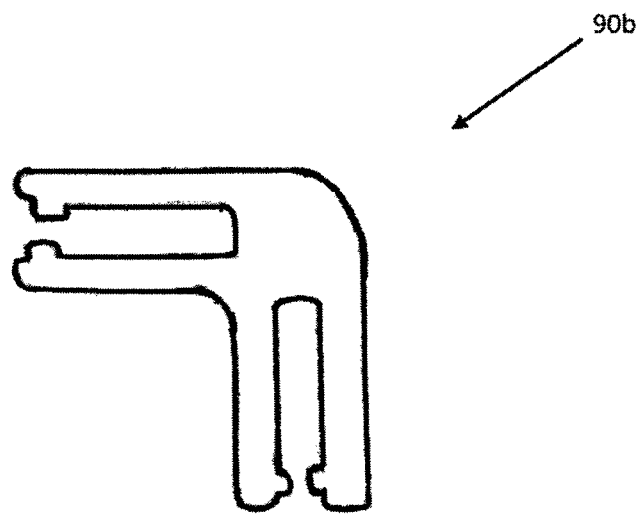
FIG. 17 shows a front view of an L-shaped connector.
Figure 18:
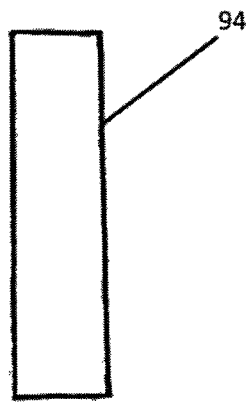
FIG. 18 shows a top view of an L-shaped connector.
Figure 19:
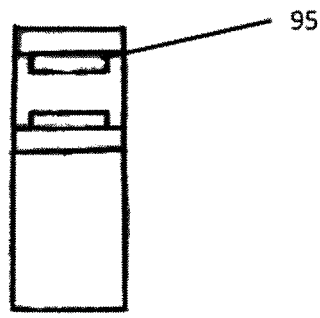
FIG. 19 shows a bottom view of an L-shaped connector.
Figure 20:
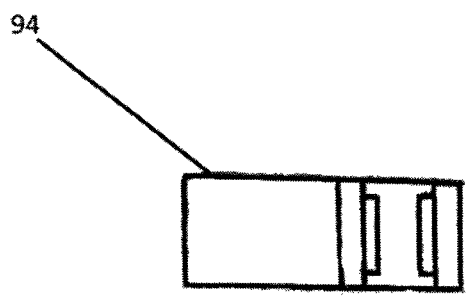
FIG. 20 shows a side view of an L-shaped connector.
Figure 21:
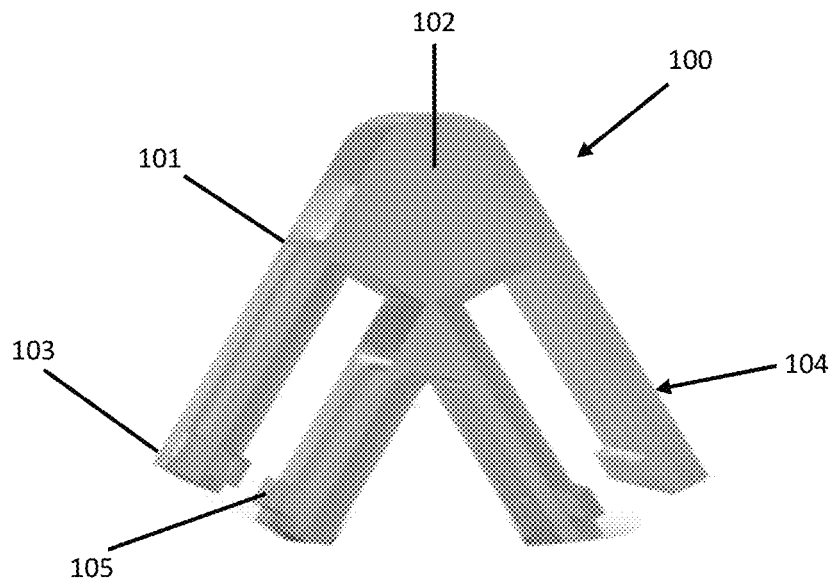
FIG. 21 shows a V-shaped connector.
Figure 22:
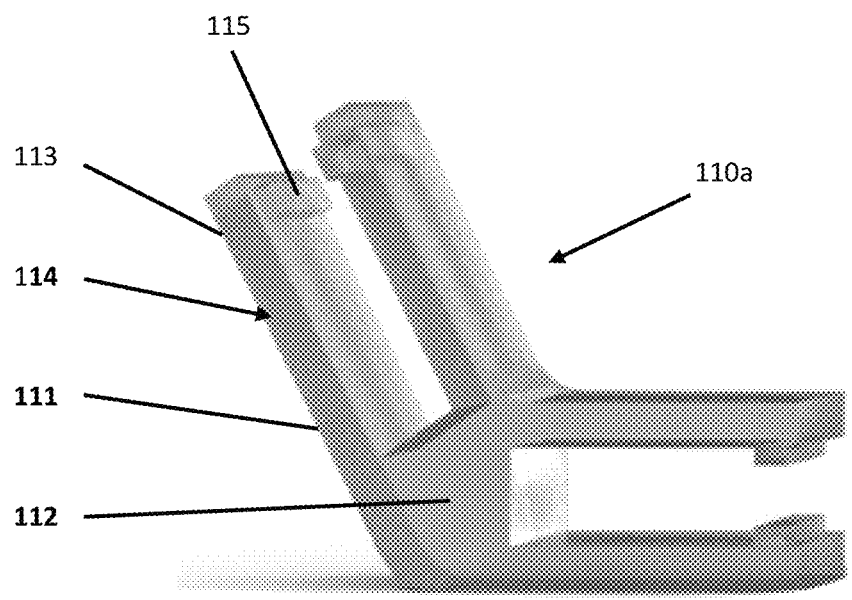
FIG. 22 shows a two-arm connector with an angle greater than 90 degrees.
Figure 23:
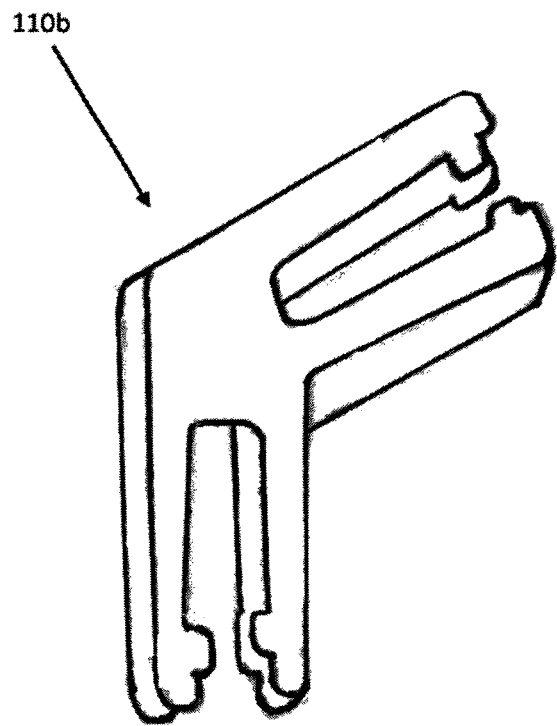
FIG. 23 shows another view of the connector shown in FIG. 22.

FIG. 16 shows an L-shaped two-way connector with a 90 degree angle between the two arms (94) The connector (90) includes a central body (92), two arms (94) extending outwardly from the central body (92), with each arm including an inner end portion (91) connected to the central body (92) and an opposite distal end portion (93). Teeth (95) are formed on the inner side of each arm portion. FIGS. 17-20 show an L-shaped connector (90b). FIG. 21 shows a two-way connector (100) with an angle of about 60 degrees between the two arms (104). The connector (100) includes a central body (102), two arms (104) extending outwardly from the central body (102), with each arm including an inner end portion (101) connected to the central body (102) and an opposite distal end portion (103). Teeth (105) are formed on the inner side of each arm portion. FIG. 22 shows a two-way connector (110a) with an angle of about 120 degrees between the two arms (114). The connector (110a) includes a central body (112), two arms (114) extending outwardly from the central body (112), with each arm including an inner end portion (111) connected to the central body (112) and an opposite distal end portion (113). Teeth (115) are formed on the inner side of each arm portion. FIG. 23 shows another embodiment of a two-way connector (110b) with a 120 degree angle between the arms.

Figure 24:
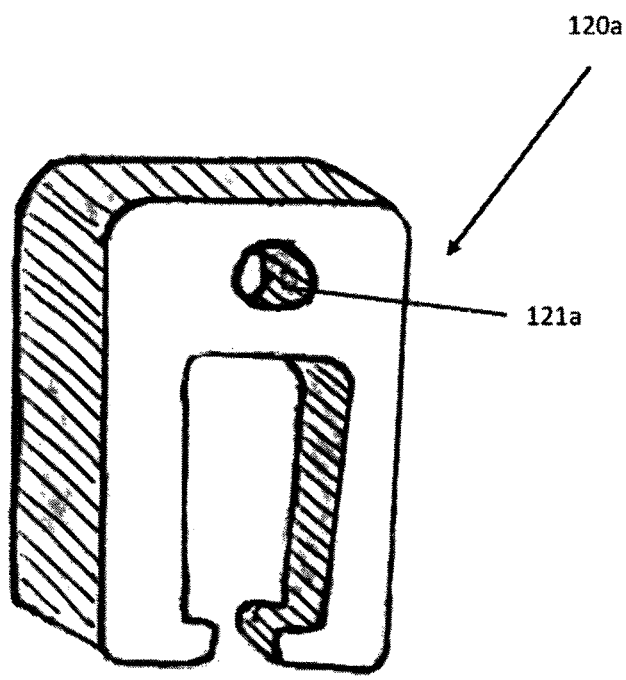
FIG. 24 shows a perspective view of a first embodiment of a U-shaped connector.
Figure 25:
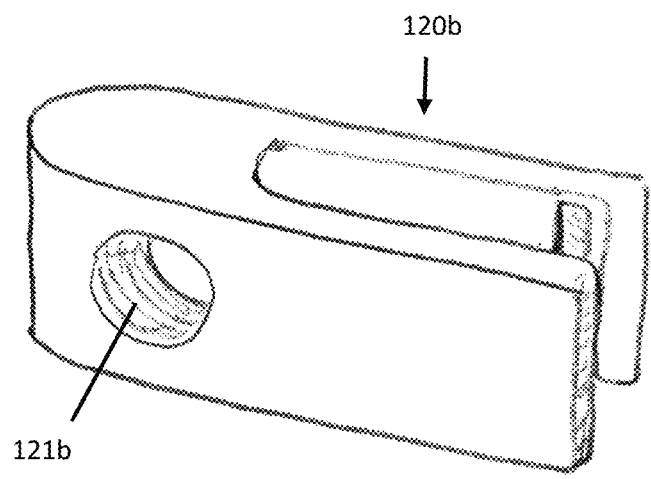
FIG. 25 shows a second embodiment of a U-shaped connector.
Figure 26:
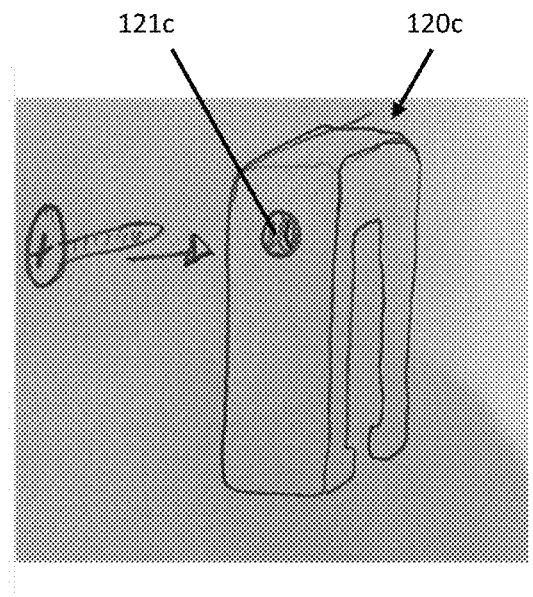
FIG. 26 shows a third embodiment of a U-shaped connector.

FIG. 24 shows a one-way connector (120a) with an aperture (121a) extending in a direction parallel to the thickness of the teeth that allows for pivoting around an axle or other rod inserted in the aperture. FIG. 25 shows a connector (120b) with an aperture (121b) extending in a direction perpendicular to the length of the teeth that allows for pivoting. This allows for wall hanging. FIG. 26 shows a connector (120c) similar to that shown in FIG. 25 except that the end of the connector that is opposite to the teeth is straight, rather than curved. The connector (120c) has an aperture (121c) formed therein.

Figure 28:
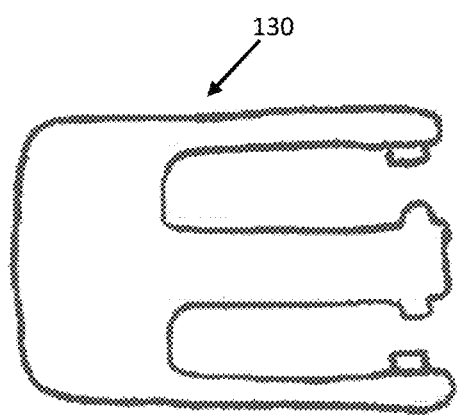
FIG. 28 shows an M-shaped connector.

FIG. 28 shown an M-shaped connector (130) in which a central arm portion functions as an arm portion for each of the two arms. The connector of FIG. 28 allows two sheets to be connected in a parallel fashion for models that might require two sheets for increased structural support.

Figure 29:
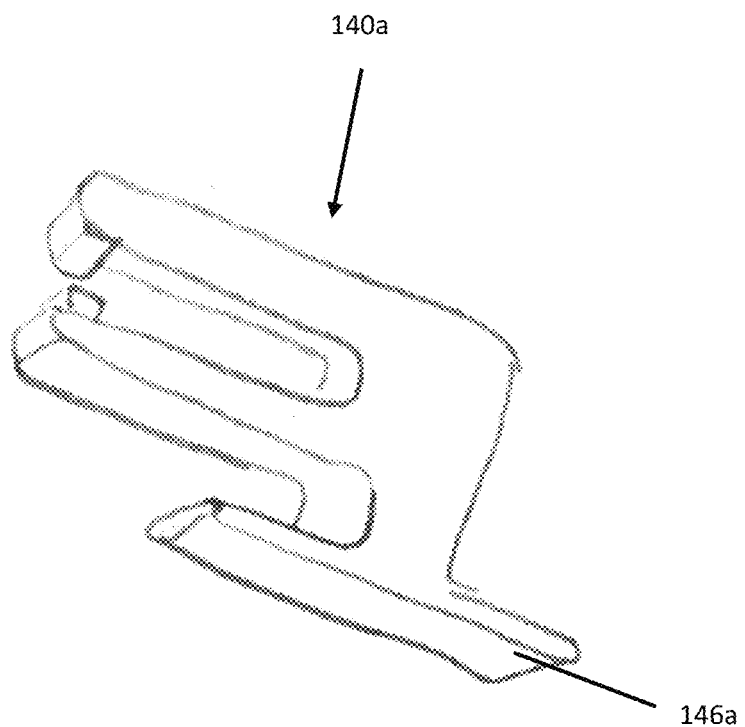
FIG. 29 shows a perspective view of yet another version of a connector that includes a mounting segment for a pivotable form.
Figure 30:
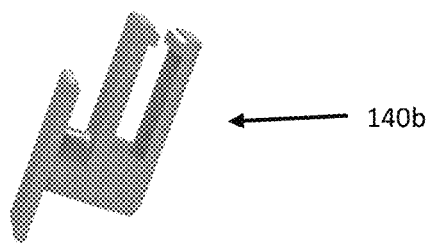
FIG. 30 shows a perspective view of another connector that includes a mounting segment.
Figure 31:
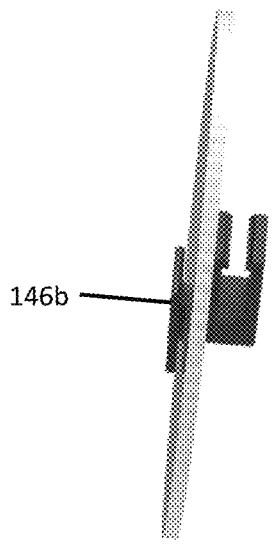
FIG. 31 shows the connector of FIG. 29 when attached to a form.
Figure 32:
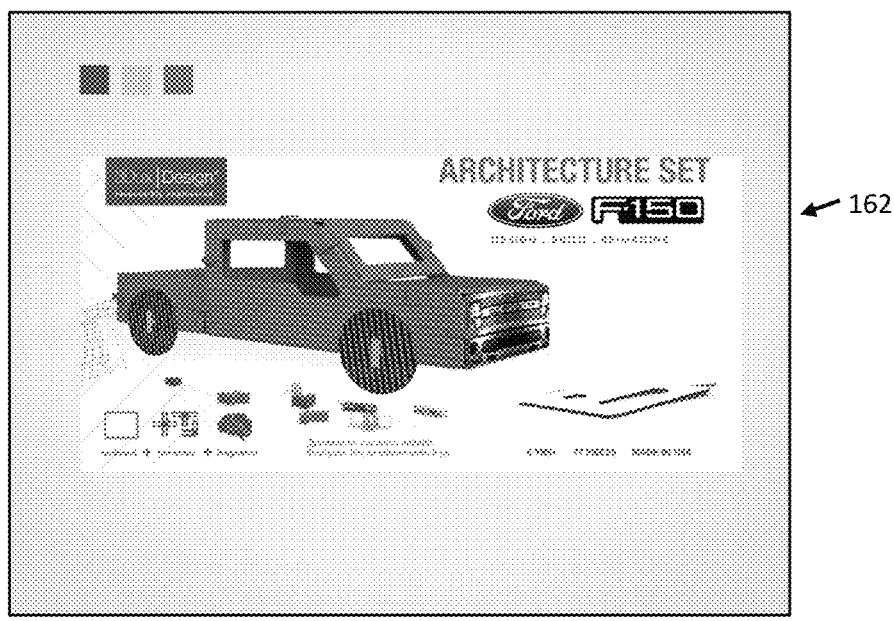
FIG. 32 shows the connector of FIG. 29 in use as a wheel mount.

FIGS. 29-30 show connectors (140a), (140b) that can be attached to model vehicles and allow for a functional wheel attachment to a form as is shown in FIG. 31 and on the Ford truck in the display (162) shown in FIG. 32. The circle with a central hole slips on over segment (146a), (146b) and forms can be gripped between the teeth of the connectors (140a), (140b).

Figure 33:
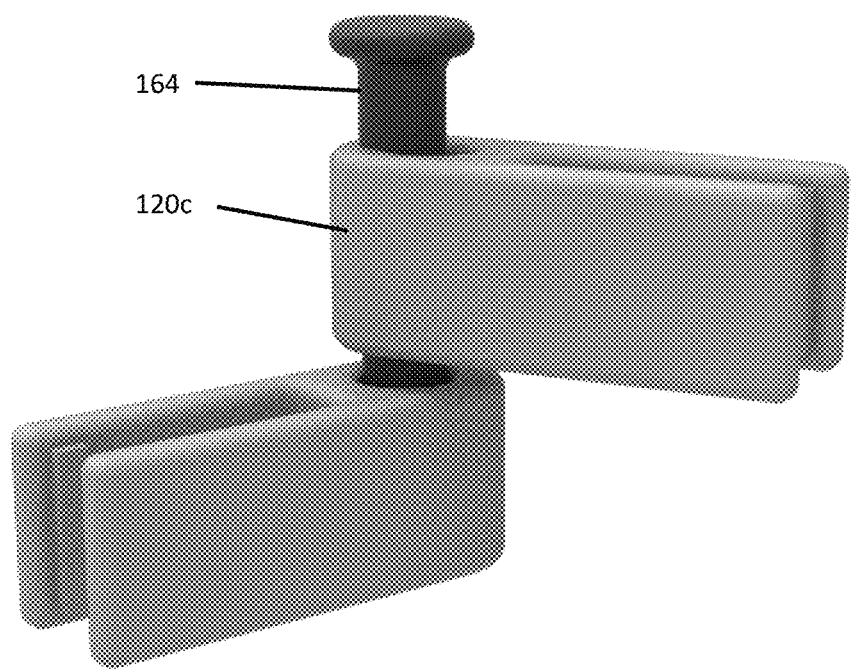
FIG. 33 shows two connectors mounted to a pivot pin.
Figure 35:
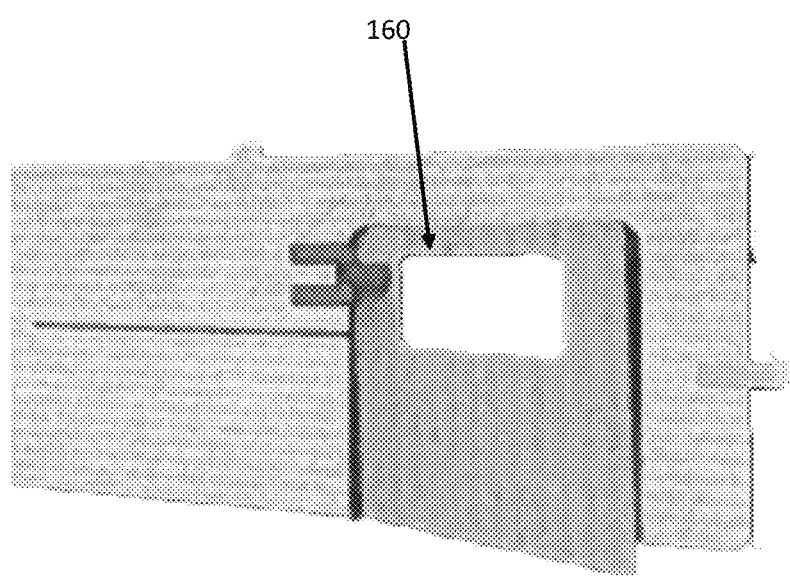
FIG. 35 shows forms of a wall, and a door attached to the wall, using the connectors.
Figure 36:
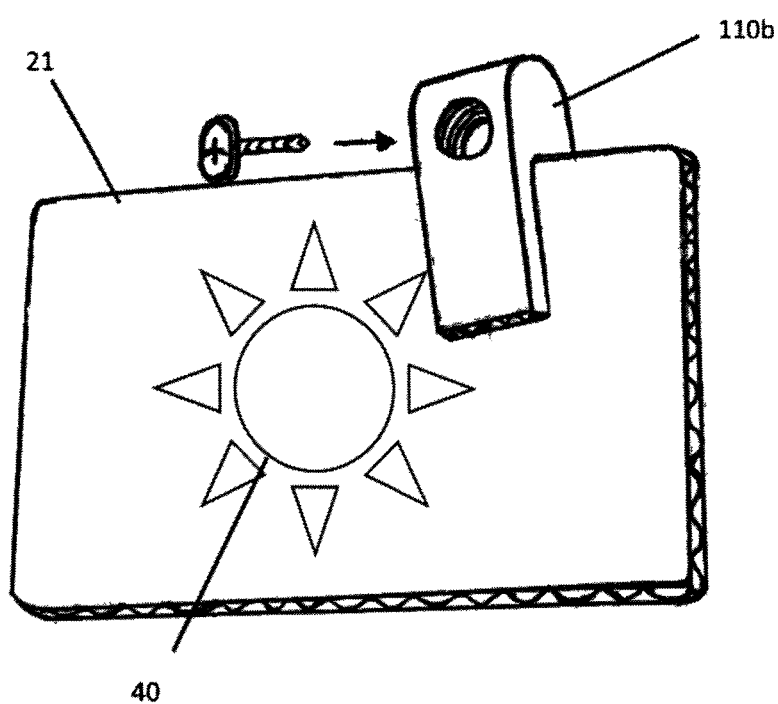
FIG. 36 shows a connector used to display art, as well as a conventional screw for mounting on a vertical structure.
Figure 37:
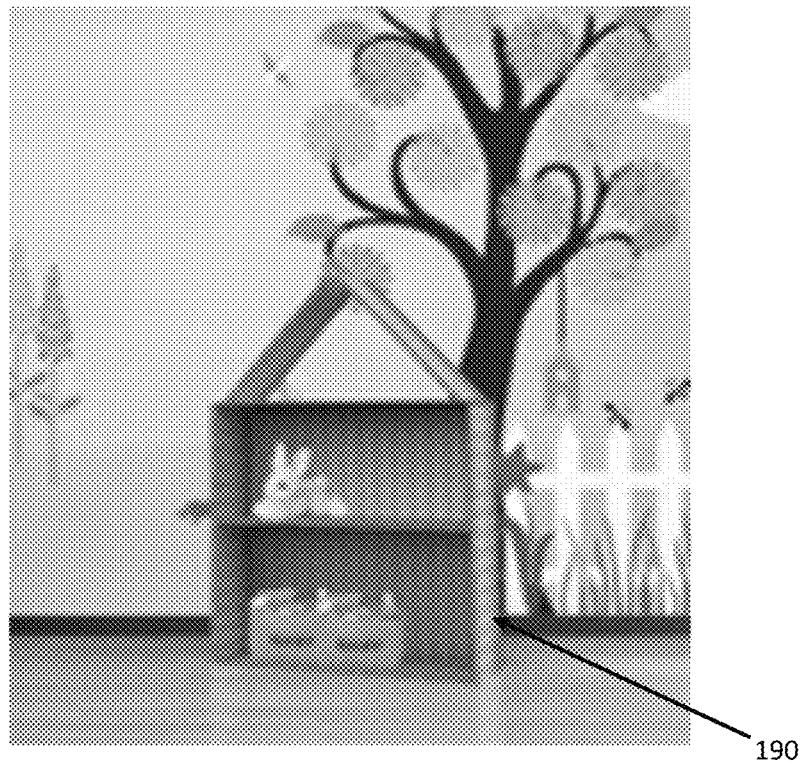
FIG. 37 shows a toy house constructed from the modeling kit described herein.

FIG. 33 shows two connectors (120c) that are mounted to a pin (164). This construction can be used to make a pivotable door, such as is shown in FIG. 35.

FIGS. 39-44 show an embodiment of a hybrid connector (200). This connector is configured to allow the connectors and forms described above to be used in conjunction with another toy construction set. The specific embodiment shown in the figures is configured to be attached to Lego® building blocks and is described in detail below.

Additionally, the angle between adjacent or opposing arms and number of protruding arms (14) may be adjusted for specific needs including but not limited to exemplary uses as shown in FIGS. 35-38 (described above) such as angled roofs, door hinges, wall hanging hardware, larger scale structures, diy games, functional wheel assemblies and freestanding triangular hexagonal or octagonal displays (not depicted).

The connectors have a unique design balancing flexibility, elasticity and structural integrity that allows for easy modeling of 3D structures using end cardboard and other flat boards including but not limited to foam board, chip board, high density fiberboard (HDF), plastic, wood pieces. The connectors have "arms" and "teeth" engineered with a balance between flexibility to accommodate thicker material and ease of assembly, elasticity to retain original shape and rigidity to ensure adequate "grab" and stability when used with materials between 0.09 inch to 0.165 inch in thickness.

This ability to accommodate a range of material thicknesses allows for use of these connectors with the range of most commonly used cardboard commercially as well as other materials available. This allows for wider range of raw materials to work with, and educates the end user on creative repurposing of recycled materials as well as encourages end user exploration and experimentation with material science. In embodiments, the connector "arms" are engineered with wall thickness and length dimensions specifically to maximize structural integrity of each arm for large scale models and to minimize breakage, an important factor in use of this product by younger children. Connector "teeth" are designed with smooth morphology to avoid deformity of cardboard or other material during insertion and removal, thus facilitating use by younger children and prolonging the integrity of the cardboard or other material for repeated use.

Connector dimensions may also be adjusted proportionately to accommodate other materials including but not limited to chipboard, plastic sheets, plywood, balsa wood, masonite for use by students or professional architects and building firms to create 3D models of work. Connector arm angles, morphology and orientation may be modified to connect geometric cardboard shapes in novel orientations including but not limited to angled roofs, free standing triangular, hexagonal, octagonal structures which may be used for creative play, educational projects or commercial pop (point of purchase) displays.

Connectors may be adapted for novel functions including but not limited to door hinges, wall hanging clips for display purposes, hanging sliding doors, functional wheel attachment. Connectors may be designed with different number of protruding arms to accommodate specific models, such as but not limited to hexagonal and octagonal structures. Connectors may be designed with protruding components that might interact with other commercially available building structures (including but not limited to Lego®, little Bits™, K'nex®, drinking straws).

Connectors are designed with consistent geometry such that they may alternatively be interlocked and assembled as a 2D mosaic without cardboard on a flat surface to improve fine motor skills and teach pattern recognition and geometry.

3D CAD files of connectors may be used for end-user personal and educational projects for higher level geometry, engineering, CAD education. The connector designs are made using geometry designed for 3D printer, injection mold and extruded material manufacturing. In this way, educators and end-users can use licensed inventor-supplied connector files for higher level STEAM education or personal projects.

Another embodiment described herein comprises pre-made kits available to be purchased by an end user, the kits containing forms and connectors. Geometric cardboard shapes supplied in architectural kits may be designed with dimensions in multiples (example 2.5"×5", 2.5"×10", 5"×10") to allow younger users to learn about geometric relationships. Alternatively, the cardboard forms may be made at unique dimensions for specific designs and builds. In some cases, geometric cardboard shapes supplied in design architectural kits are designed with ⅜-¼ inch corner radii for improved aesthetic design and/or to prolong the structural integrity of each piece. Cardboard shapes can be constructed with one white, matte finish side to supply a modern aesthetic consistent with the 3 Dux/design brand, allow end user to easily paint, color, glue and decorate their constructed model. Alternatively, supplied cardboard may be printed for aesthetic (graphic patterns) or educational purposes (ruler measurement units).

In one embodiment, an online platform (website) can be made available for licensed, "open-source" collaboration by the community to allow for CAD file and cardboard kit template and file sharing. In this way, the community of like-minded users can share, learn from each other and learn how to work together.

The connectors are designed with similar contours (flat on two sides, "arms" with opposing "teeth" across all shapes of connectors. This not only allows for 2D mosaics, but also allows for the ability to build 3D structures using the connectors only.

As noted above, the embodiments described herein depict architectural modeling kits comprising semi-rigid connectors, downloadable CAD files of these connectors, and geometric shaped cardboard forms designed to offer an environmentally friendly creative and educational platform for STEAM education with the aforementioned unique benefits of integrating modern technology, complex mathematical thinking, creativity, fine motor skills, artistic expression and environmental awareness. The simple, intuitive, design of the connectors and supplied geometric forms along with the open-ended format make this product an ideal tool for occupational therapy, art therapy fine, and motor control exercises in children and adults.

Combining the Connector and Forms with Other Construction Sets

In embodiments, a set of connectors include hybrid connectors that integrate with components of commercially available building block toy sets including but not limited to Lego® brand. One or more sides of the hybrid connectors are configured to snap or otherwise removably attached to one or more sides of a commercially available block or other building component. The part of the hybrid connector that is intended to be attached to the commercially available component will have the same general morphology as the protrusions on the rest of the connectors such as to fit single ply corrugated cardboard, or another sheet material. This allows for integration of building blocks with cardboard (or other material) construct to increase the scope and use of both the connecting system and the conventional building system. In the non-limiting embodiment shown in FIGS. 39-44, a hybrid connector (200) includes an arm (210) fixed to a block (220). The bottom surface (221) of the block has one, two three or more square or rectangular indentations (222) (which do not extend all the way to the top surface (224) of the block (220)) configured to receive one, two, three or four circular protrusions on the top side of a Lego® brick.

Methods of Using the Connectors and Forms

The system of forms and connectors is used by placing the forms between pairs of teeth in the connectors. A combination of connectors is used to dispose forms at angles relative to one another. Multiple connectors can be attached to a single form, and multiple forms can be attached to a single connector. Various structure can be built, including but not limited to model buildings, cars, people and animals.

Methods of Manufacturing the Connectors and Forms

The connectors can be made by additive manufacturing, extruding, injection molding, compression molding, or another suitable manufacturing technique. Non-limiting examples of suitable techniques of additive manufacturing include In one embodiment, the connectors are 3D printed using an electronic data source such as software that contains the instructions for printing the connectors, for example a computer-aided-design (CAD) file or an additive manufacturing file (AMF), or software for both scanning a model and printing.

Connector material includes but is not limited to polylactic acid (PLA) resin and acrylonitrile butadiene styrene (ABS) when manufactured by 3D printing methods. Thermoplastic and/or thermoset materials having suitable properties of durability, elasticity and hardness when 3D printed, injection molded, compression molded or extruded can be used. Non-limiting examples of materials suitable for forming the connectors are thermoplastic polymers and blends thereof, thermoset polymers and blends thereof, thermoplastic elastomers, fiber-polymer composites, ceramic-polymer composites, metal-polymer composites, etc. In embodiments, the connectors are formed with arms having arm portions that are sufficiently flexible that the pairs of teeth will separate from one another when a piece of corrugated or non-corrugated cardboard is pushed between them. In embodiments, the connectors have sufficient flexibility that they can be used in conjunction with panels having different thicknesses and degrees of softness.

As indicated above, the forms can be made or cardboard, paper, thermoplastic, thermoset, or another suitable material. In embodiments, the forms that are connected to create structures comprise panels having a variety of shapes. The shapes cut be cut from sheet material by laser cutting, stamping, or another suitable cutting technique. In other embodiments, the forms are shaped by molding.

A number of alternatives, modifications, variations, or improvements therein may be subsequently made by those skilled in the art, which are also intended to be encompassed by the following claims.

What is claimed is:

1. A building model connector set, comprising:
    a plurality of corrugated cardboard forms, and
    a plurality of connectors configured to removably connect to the corrugated cardboard forms, each connector being formed from a thermoplastic or thermoset material and comprising:
        a rigid central body having a thickness,
        an arm extending outwardly from the central body, the arm including an elastically flexible first arm portion, and an elastically flexible second arm portion, each arm portion having a first end connected to the central body and a distal end spaced from the first end, an inner surface, an outer surface, a first side surface and a second side surface, the first arm portion and the second arm portion each having a length in the range of 0.4 inches to 0.7 inches in a direction from the first end to the distal end, a height in the range of 0.05 inches to 0.07 inches in a direction from the inner surface to the outer surface, and a thickness in the direction from the first side surface to the second side surface that is the same as the thickness of the central body and is in the range of 0.2 inches to 0.5 inches, the inner surface of the first arm portion being generally parallel to the inner surface of the second arm portion when the connector is not in use; and
        first and second gripping teeth formed at the distal end of the first arm portion and the second arm portion, respectively, on the inner surface thereof, the first and second gripping teeth being configured to removably connect to a corrugated cardboard form, without touching any other gripping teeth while connected to the form, each of the first and second gripping teeth having a length in the range of 0.03 inches to 0.07 inches and a thickness, wherein the length of each of the first and second gripping teeth extends parallel to the length of the first arm portion and the second arm portion and the thickness extends parallel to the thickness of the first arm portion and the second arm portion, each of the first and second gripping teeth has at least one of (a) a terminal end surface having a convex profile when viewed from a direction normal to the first side surface, and (b) a flat terminal end surface; wherein the first and second gripping teeth are positioned at the same distance from the central body, and the terminal end surfaces of the first and second gripping teeth are spaced from one another in an amount between 0.04 inches and 0.12 inches.

2. The building model connector set of claim 1, wherein at least one of the plurality of connectors includes at least two arms.

3. The building model connector set of claim 2, wherein the at least two arms are co-linear.

4. The building model connector set of claim 2, wherein the at least two arms are parallel and adjacent to one another.

5. The building model connector set of claim 4, wherein the first arm portion of the first arm and the first arm portion of the second arm are formed as a single component.

6. The building model connector set of claim 2, wherein the at least two arms are at an angle of between 30 degrees and 150 degrees relative to one another.

7. The building model connector set of claim 1, wherein each connector includes a plurality of uniformly spaced arms, each arm having a longitudinal axis, wherein the axes of the arms are spaced apart at an angle of 360/n degrees, where n is the total number of arms.

8. The building model connector set of claim 1, wherein at least one of the plurality of connectors includes at least three arms.

9. The building model connector set of claim 1, wherein at least one of the plurality of connectors includes an extension portion configured to rotatably support a form.

10. The building model connector set of claim 1, wherein the central body of at least a portion of the plurality of connectors has an aperture formed therethrough.

11. The building model connector set of claim 10, wherein at least one of the plurality of connectors is a hybrid connector configured for attachment to a toy building block.

12. The building model connector set of claim 1, wherein at least a portion of the plurality of corrugated cardboard forms comprise flat building panels.

13. The building model connector set of claim 1, wherein the thickness of each of the first and second gripping teeth is 0.26 inches.

14. The building model connector set of claim 1, wherein the terminal end surfaces of the first and second gripping teeth are smooth surfaces.

15. The building model connector set of claim 1, wherein the terminal end surfaces of the first and second gripping teeth are textured surfaces.

16. The building model connector set of claim 1, wherein the central body of at least one of the plurality of connectors is solid.

17. The building model connector set of claim 1, wherein the inner surfaces of the first arm portion and second arm portion can move apart from one another when a form is placed between the first and second gripping teeth.

18. The building model connector set of claim 1, wherein the plurality of connectors includes at least one 2-way connector, at least one 3-way connector, and at least one 4-way connector.

19. A method, comprising:
obtaining a plurality of corrugated cardboard forms,
obtaining a plurality of connectors, each connector being formed from a thermoplastic or thermoset material and comprising:
  a rigid central body,
  an arm extending outwardly from the central body, the arm including an elastically flexible first arm portion, and an elastically flexible second arm portion, each arm portion having a first end connected to the central body and a distal end spaced from the first end, an inner surface, an outer surface, a first side surface and a second side surface, the first arm portion and the second arm portion each having a length in a direction from the first end to the distal end, a height in a direction from the inner surface to the outer surface, and a thickness in the direction from the first side surface to the second side surface, the inner surface of the first arm portion being generally parallel to the inner surface of the second arm portion when the connector is not in use, and first and second gripping teeth formed at the distal end of the first arm portion and the second arm portion, respectively, on the inner surface thereof, each of the first and second gripping teeth having at least one of (a) a terminal end surface having a convex profile when viewed from a direction normal to the first side surface, and (b) a flat terminal end surface, wherein the first and second gripping teeth are positioned at the same distance from the central body, the terminal end surfaces of the first and second gripping teeth being spaced from one another in an amount between 0.04 inches and 0.12 inches,
  each of the first and second gripping teeth having a length in the range of 0.03 inches to 0.07 inches and having a thickness, wherein the length of each of the first and second gripping teeth extends parallel of the length of the first arm portion and the second arm portion, and the thickness of each of the first and second gripping teeth extends parallel to the thickness of the first arm portion and the second arm portion, and
connecting the plurality of corrugated cardboard forms to one another using the connectors, wherein a portion of each form is inserted between at least one set of the first and second gripping teeth of at least one connector in a direction parallel to the outward direction of the arm through a gap formed between the first and second gripping teeth,
wherein the first and second gripping teeth do not touch any other gripping teeth while connecting the plurality of forms to one another.

20. The method of claim 19, wherein the plurality of connectors includes at least one 2-way connector, at least one 3-way connector, and at least one 4-way connector.

21. The method of claim 19, wherein at least one connector has an aperture formed in the central body, further comprising positioning a rod-shaped component in the aperture.

22. A building model connector set, comprising:
a plurality of flat corrugated cardboard forms, and
a plurality of connectors configured to removably connect to the corrugated cardboard forms, each connector being formed from a thermoplastic or thermoset material and comprising:
  a rigid central body having a thickness,
  an arm extending outwardly from the central body, the arm including an elastically flexible first arm portion and an elastically flexible second arm portion, each arm portion having a first end connected to the central body and a distal end spaced from the first end, an inner surface, an outer surface, a first side surface and a second side surface, the inner surface of the first arm portion being generally parallel to the inner surface of the second arm portion when the connector is not in use, the first arm portion and the second arm portion each having a length in the range of 0.4 inches to 0.7 inches in a direction from the first end to the distal end, a height in the range of 0.05 inches to 0.07 inches in a direction from the inner surface to the outer surface, and a thickness that is the same as the thickness of the central body and is in the range of 0.2 inches to 0.5 inches in the direction from the first side surface to the second side surface, the second arm portion being spaced from the first arm portion in a direction parallel to the height of the first and second arm portions,
  the first arm portion including
    a first gripping tooth protruding from the distal end of the first arm portion having at least one of
    (a) a terminal end surface having a convex profile when viewed from a direction parallel to the thickness of the first arm portion, and (b) a flat terminal end surface,
    a second gripping tooth protruding from the distal end of the second arm portion having at least one of
    (a) a terminal end surface having a convex profile when viewed from a direction parallel to the thickness of the second arm portion, and (b) a flat terminal end surface, the terminal end surfaces of the first and second gripping teeth being spaced from one another in an amount between 0.04 inches and 0.12 inches,
    each of the first and second gripping teeth having a length in the range of 0.03 inches to 0.07 inches and having a thickness of 0.26 inches, which is equal to, or less than, the thicknesses of the first arm portion and the second arm portion, wherein the length of each of the first and second gripping teeth extends parallel of the length of the first arm portion and the second arm portion, and the thickness of each of the first and second gripping teeth extends parallel to the thickness of the first arm portion and the second arm portion,
    the first and second gripping teeth being the only gripping teeth on the first and second arm portions, being positioned at the same distance from the central body and configured to removably engage with a corrugated cardboard form.

23. The building model connector set of claim 22, wherein the first and second gripping teeth both have terminal end surfaces with convex profiles when viewed from the direction parallel to the thickness of the first arm portion and the second arm portion, and the shortest distance between the terminal end surfaces of the first and second gripping teeth is in the range of 0.04 inches and 0.12 inches.

* * * * *